United States Patent
Lindfors et al.

(10) Patent No.: US 8,171,889 B2
(45) Date of Patent: May 8, 2012

(54) METHOD AND A DEVICE FOR SAFEGUARDING A HORSE IN A TRANSPORT

(76) Inventors: Kristina Lindfors, Gammelstad (SE); Nils-Olov Lindfors, Gammelstad (SE)

( * ) Notice: Subject to any disclaimer, the term of this patent is extended or adjusted under 35 U.S.C. 154(b) by 1025 days.

(21) Appl. No.: 11/658,542

(22) PCT Filed: Aug. 3, 2005

(86) PCT No.: PCT/SE2005/001193
§ 371 (c)(1), (2), (4) Date: Jan. 24, 2007

(87) PCT Pub. No.: WO2006/014137
PCT Pub. Date: Feb. 9, 2006

(65) Prior Publication Data
US 2008/0289583 A1    Nov. 27, 2008

(30) Foreign Application Priority Data
Aug. 5, 2004 (SE) ........................................ 0401991

(51) Int. Cl.
*A01K 15/04* (2006.01)

(52) U.S. Cl. .......................... 119/712; 119/412; 119/856

(58) Field of Classification Search ................... 119/400, 119/403, 771, 783, 865, 856, 863; 296/24.31; 54/34
See application file for complete search history.

(56) References Cited

U.S. PATENT DOCUMENTS

| | | | | |
|---|---|---|---|---|
| 225,715 | A * | 3/1880 | Middleton | 119/712 |
| 1,045,308 | A * | 11/1912 | McManigal | 54/71 |
| 5,867,877 | A * | 2/1999 | Patterson et al. | 24/598.5 |
| 6,612,265 | B1 * | 9/2003 | Birdsong | 119/856 |
| 6,769,235 | B1 * | 8/2004 | Hayes | 54/71 |

FOREIGN PATENT DOCUMENTS

| | | |
|---|---|---|
| DE | 10036582 | 2/2002 |
| DE | 10036582 A1 * | 2/2002 |
| DE | 10061591 A1 * | 6/2002 |
| GB | 357643 | 9/1931 |

\* cited by examiner

*Primary Examiner* — Kimberly Berona
*Assistant Examiner* — Danielle Clerkley
(74) *Attorney, Agent, or Firm* — Mark P. Stone

(57) ABSTRACT

A device to safeguard a horse in a horse carrier or trailer includes a harness (25,26) on the horse and the safety belts (28-31) affixed to the walls of the carrier (14-16) at the level of the breast of the horse. The harness is fastened around the breast and secured around the withers and ribcage so that its connecting device (44) is situated at the level of the breast of the horse. The horse is lead into the trailer or carrier and preferably tethered, before, standing in front of the horse, one affixes the harness to the safety belts.

3 Claims, 3 Drawing Sheets

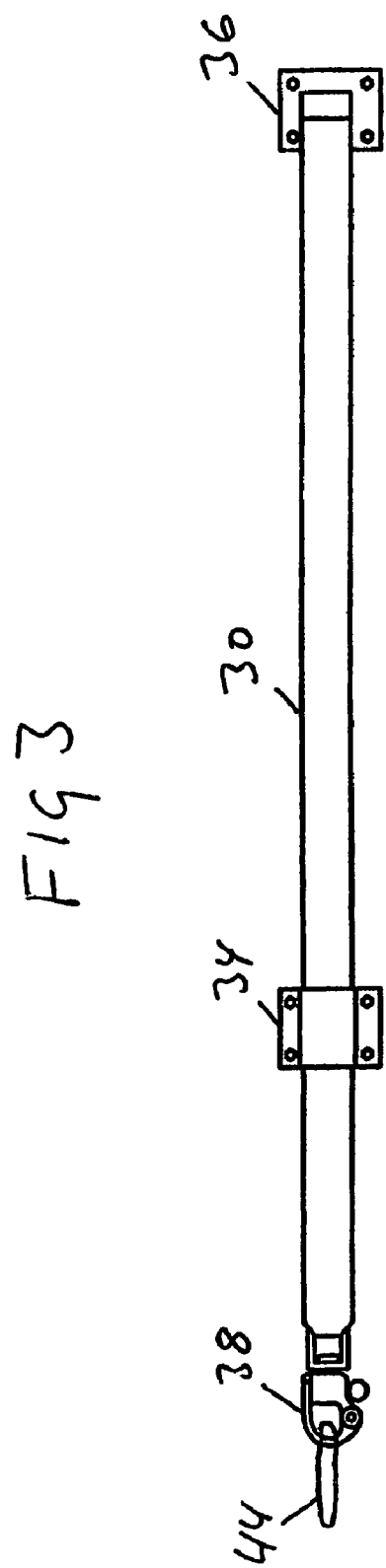

METHOD AND A DEVICE FOR SAFEGUARDING A HORSE IN A TRANSPORT

TECHNICAL AREA

The present invention relates to a method and a device for securing a horse in a horse carrier.

BACKGROUND OF THE INVENTION

Riding horses as well as trotters need to be ported and the transport of a horse can be frequent for example if a riding club is used that is not in direct connection to the stable. Most frequently a carrier for horses in the form of trailer pulled by a passenger car or SUV is used. The horse is usually transported with its head in a forward position and it is tightly fitted propped sideways preventing it from falling in the case of a sideward movement. Should the horse however successfully lie down it will be injured because it cannot raise itself up in such a narrow space. At the application of the brake the horse will be throw forward. If the brakes are applied gently the horse can be warded off (parry) but if the breaking is sudden the horse is thrown forward. Often there is a beam at the level of the breast which stops the horse from being flung forward and the horse is exposed to various degrees of pain or even to injury should the brakes be applied suddenly. Such incidents can cause the horse to refuse to enter the carrier the next time it is to be transported even if it has not been exposed to serious injury. Also it can occur that a horse throws itself forward going under the beam and then it is seized by panic and breaks its back when it tries to rise itself up again. It has also been found that horses rear up and get fastened on the beam.

OBJECT OF INVENTION

It is an object of the invention to reduce the risk of a horse being subject to pain or injuring itself during transport.

BRIEF DESCRIPTION OF THE INVENTION

The method according to the invention is characterised by the steps of mounting a harness around the breast and securing it around withers and rib cage, and leading the horse into the trailer and preferably tethering it before, standing in front of the horse, one couples the harness to sty belts which are fastened to the walls of the carrier at the level of the breast of the horse.

The safety device according to the invention is characterised by a harness to be placed around the breast of the horse and secured around withers and rib cage, safety belts attached to the walls of the trailer on each side of the horse, and connecting devices for connection of the harness with the safety belts.

The safety belts are preferably fastened to the sides of the carrier at the breast and ribcage of the horse adjacent the sides of the ribcage.

BRIEF DESCRIPTION OF THE DRAWINGS

FIG. 3 shows enlarged a safety belt, which is also shown in FIGS. 1 and 2.

DETAILED DESCRIPTION OF THE ILLUSTRATED DEVICE AND ITS USE

Figure 1:
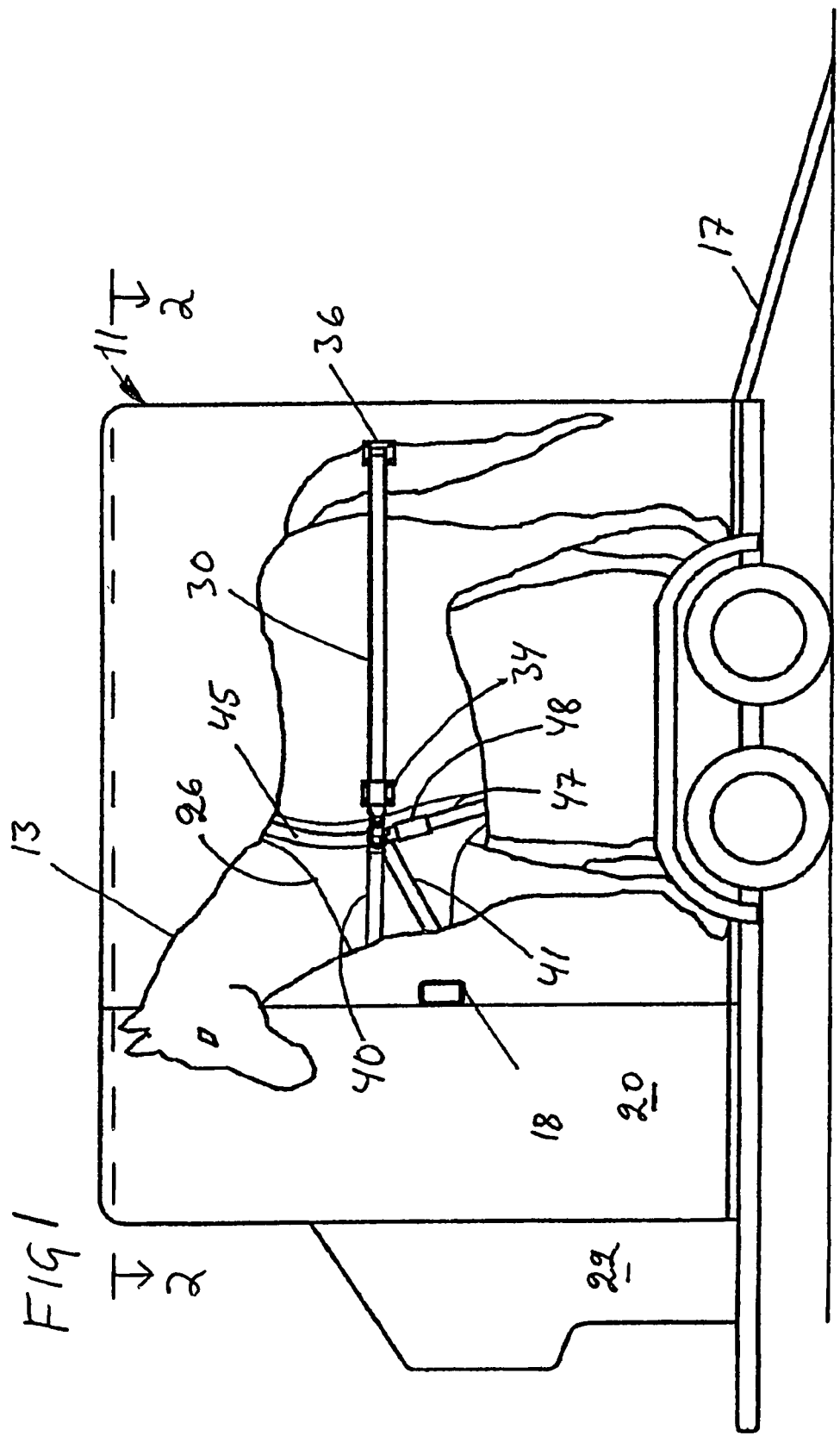
FIG. 1 shows a horse carrier seen as indicated by the arrows 1-1 in FIG. 2
Figure 2:
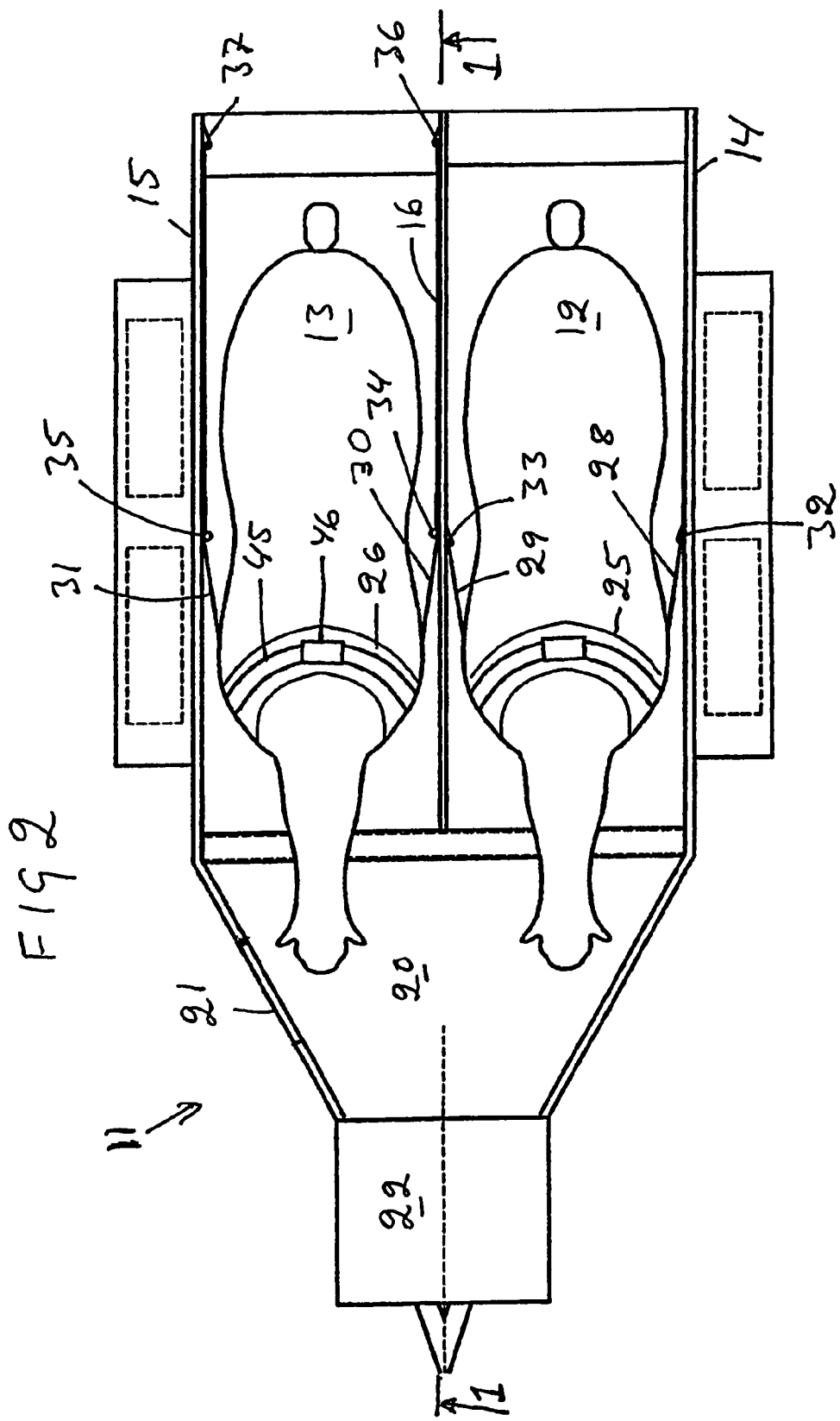
FIG. 2 is a longitudinal section along line 2-2 in FIG. 1

FIGS. 1 and 2 show a horse carrier 11 in the form of at miler on wheels for two horses 12, 13. Its side walls have got the reference numbers 14, 15 and its inner wall reference number 16. The back wall of the carrier has its lower part down-foldable to form a ramp 17. The carrier has a cross beam or cross bar 18 at the level of the breast of the horse where the inner wall 16 ends and a forward narrowing space 20 with a door 21 is in front of this bar. In front of the space 20 is a space for storage 22.

The figures show the harnesses 25,26 on the horses 12,13. Their back parts are connected to safety belts 28,29,30,31 affixed in the walls 14,15,16. When the walls of the carrier are sturdy enough, short belts 28,29 can be affixed to the wall fixtures 32,33 for securing the horse 12 as shown. Often the carriers are constructed to be so light in weights that the walls cannot stand the forces that can be created and then one can use longer belts that pass through the fasteners 34,35 and are firmly affixed in anchoring means 36,37 inside the back part of the carrier, for securing the horse, as shown. One then calculates the wall-fasteners 34,35 in order that they break or come lose by themselves before the walls are too deformed by the pulling force component at right angle to the walls. Then, instead, the belts 30,31 are stretched directly between the harness 26 and its anchoring means 36,37 without putting pressure on the walls FIG. 3 shows enlarged the belt 30 with its fastening 34, its anchoring 36 and a connecting means 38 in the form of a sheet hook 44 for connecting the belt with the harness 26.

The fasteners 32-35 are mounted in the walls at the level of the ribcages of the horses and at the middle or back parts of the ribcages. They prevent the horses from moving vertically and stop the horses both from rearing up and from laying down. At the same time, the wall fixtures are placed so far forward that they are reachable for a person standing in the space 20 in front of the beam 18, which means that they are located at the side of the ribcage of the horse. The fasteners should have rounded forms to prevent injury to the horse.

As best illustrated by FIG. 2 of the drawing, the front ends of each of the safety belts for the 28, 29, 30, and 31 are accessible at a distance no farther back than the front half of the horses 12, 13, respectively, by a person standing in the horse carrier 11 in the space 20 in front of the horses 12, 13.

The harness 25,26 consists of a strong and rather stiff woven material with inside padding, which is strengthened by bands 40,41 which pass around the breast and have their ends joined where they on both sides have a connecting means 44 in the form of a triangular ring into which the belt connecting device 38 can be connected (FIG. 3). The connecting devices 44,38 should be such that they can be disconnected even if the belts are stretched. Each harness also has a band 45 over the withers that is tightened by a buckle 46, and a band 47 under the ribcage that is tightened by a buckle 48. The harnesses need not have the shown appearance, but can instead for example be made of only bands that are connected together without cloth between them, but the stiff cloth makes it simpler to mount the harness. The important thing is that the harnesses 25,26 keeps the attachments of the belts 28-31 fix on the horses. As an alternative safety belts can be used that are directly connect to each other so that the harness does not need to take the pulling forces. The harness must then have a reinforcing plate in front of it to distribute the force from the belts and the belts are connected to the harness only for maintaining their vertical position.

Loading of a horse into a carrier is carried out in the following way:

The horse with its harness on is lead on to the ramp and the person leading the horse crawls under the beam 18 in the space 20 and tethers the horse, suitably at the beam. The person stretches across the bar and grips one of the belts 28-31 and connects it to the harness 25,26. Then the person also connects the belt which is situated on the other side of the horse to the harness.

The invention claimed is:

1. A device for securing a horse in a horse carrier, said device comprising a harness (25, 26) to be placed around the breast of the horse and secured around withers and rib cage, safety belts (28-31) attached to the walls of the carrier (14-16) on each side of the horse, and connecting devices (44, 38) for connection of the harness with the safety belts, wherein each of the safety belts (28-31) are attached to the walls of the carrier (14-16) adjacent the rib cage of the horse as far forward that they the front ends of each of said safety belts are reachable for a person standing in front of a cross beam (18) in front of the horse, each of said safety belts being accessible from a distance no further back from the front half of a horse within the carrier, and the safety belts (28, 29) pass backwards through fasteners (32-35) on the walls of said carrier and are anchored in anchoring means (36, 37) in the back end of the carrier.

2. The device according to claim 1, wherein the safety belts (28-31) are attached to the walls of the carrier as far forward that the safety belts prevent the horse from raising itself up or laying down.

3. The device according to claim 1, wherein said fasteners (32-35) are dimensioned to give way at a predetermined load causing the walls to be released from the load and the safety belts (28, 29) to be stretched from their anchoring means (36, 37).

* * * * *

UNITED STATES PATENT AND TRADEMARK OFFICE
CERTIFICATE OF CORRECTION

| | | |
|---|---|---|
| PATENT NO. | : 8,171,889 B2 | Page 1 of 1 |
| APPLICATION NO. | : 11/658542 | |
| DATED | : May 8, 2012 | |
| INVENTOR(S) | : Kristina Lindfors et al. | |

It is certified that error appears in the above-identified patent and that said Letters Patent is hereby corrected as shown below:

Column 4, Line 1 (Claim 1, Line 9): Delete "they".

Signed and Sealed this
Nineteenth Day of June, 2012

David J. Kappos
*Director of the United States Patent and Trademark Office*